(12) United States Patent
Chaudhari et al.

(10) Patent No.: US 12,020,130 B2
(45) Date of Patent: *Jun. 25, 2024

(54) AUTOMATED TRAINING AND SELECTION OF MODELS FOR DOCUMENT ANALYSIS

(71) Applicant: Icertis, Inc., Bellevue, WA (US)

(72) Inventors: Dhruv Chaudhari, Pune (IN); Harshil Shah, Pune (IN); Amitabh Jain, Pune (IN); Monish Mangalkumar Darda, Pune (IN)

(73) Assignee: Icertis, Inc., Bellevue, WA (US)

( * ) Notice: Subject to any disclaimer, the term of this patent is extended or adjusted under 35 U.S.C. 154(b) by 513 days.

This patent is subject to a terminal disclaimer.

(21) Appl. No.: 17/186,893

(22) Filed: Feb. 26, 2021

(65) Prior Publication Data

US 2022/0019943 A1    Jan. 20, 2022

Related U.S. Application Data

(63) Continuation of application No. 16/231,842, filed on Dec. 24, 2018, now Pat. No. 10,936,974.

(51) Int. Cl.
*G06N 20/20* (2019.01)
*G06N 20/00* (2019.01)

(52) U.S. Cl.
CPC ............ *G06N 20/20* (2019.01); *G06N 20/00* (2019.01)

(58) Field of Classification Search
None
See application file for complete search history.

(56) References Cited

U.S. PATENT DOCUMENTS 6,505,195 B1    1/2003  Ikeda et al.
7,519,589 B2    4/2009  Charnock et al.
(Continued)

FOREIGN PATENT DOCUMENTS

| EP | 1946254 B1 | 2/2012 |
| WO | 2009061917 A1 | 5/2009 |
| WO | 2018042548 A1 | 3/2018 |

OTHER PUBLICATIONS

Magazzeni, Daniele, Peter McBurney, and William Nash. "Validation and verification of smart contracts: A research agenda." Computer 50, No. 9 (2017): 50-57. (Year: 2017).*

(Continued)

*Primary Examiner* — Vincent Gonzales
(74) *Attorney, Agent, or Firm* — John W. Branch; Branch Partners PLLC

(57) ABSTRACT

Embodiments are directed to a machine learning engine that determines training documents and validation documents from a plurality of documents. The machine learning engine may determine attributes associated with the documents. In response to receiving a request to predict attribute values of a selected document the machine learning engine may train a plurality of ML models to predict the attribute values based on the training documents and the attributes and associate the trained ML models with an accuracy score. The machine learning engine may determine candidate ML models from the trained ML models based on the training accuracy scores. The machine learning engine may evaluate and rank the candidate ML models based on the request and the validation documents. The machine learning engine may generate confirmed ML models based on the ranked candidate ML models such that the confirmed ML models may answer the request.

14 Claims, 9 Drawing Sheets

(56) References Cited

U.S. PATENT DOCUMENTS

| | | | |
|---|---|---|---|
| 7,617,164 | B2 | 11/2009 | Burges et al. |
| 7,689,531 | B1 | 3/2010 | Diao et al. |
| 8,411,935 | B2 | 4/2013 | Eaton et al. |
| 8,429,103 | B1 | 4/2013 | Aradhye et al. |
| 8,626,682 | B2 | 1/2014 | Malik et al. |
| 8,868,472 | B1 | 10/2014 | Lin et al. |
| 8,965,814 | B1 | 2/2015 | Rangan |
| 9,235,812 | B2 | 1/2016 | Scholtes |
| 9,384,450 | B1 | 7/2016 | Cordes et al. |
| 9,922,285 | B1 | 3/2018 | Glode et al. |
| 10,133,791 | B1 | 11/2018 | Chan |
| 11,157,475 | B1 | 10/2021 | Cobb et al. |
| 2004/0083119 | A1* | 4/2004 | Schunder ............... G06Q 10/10 705/7.31 |
| 2004/0103305 | A1 | 5/2004 | Ginter et al. |
| 2005/0060643 | A1 | 3/2005 | Glass et al. |
| 2005/0102130 | A1 | 5/2005 | Quirk et al. |
| 2005/0108001 | A1 | 5/2005 | Aarskog |
| 2005/0154692 | A1 | 7/2005 | Jacobsen et al. |
| 2005/0228783 | A1 | 10/2005 | Shanahan et al. |
| 2007/0087756 | A1 | 4/2007 | Hoffberg |
| 2007/0239632 | A1 | 10/2007 | Burges et al. |
| 2008/0101689 | A1 | 5/2008 | Forman |
| 2008/0195577 | A1 | 8/2008 | Fan et al. |
| 2008/0249764 | A1 | 10/2008 | Huang et al. |
| 2008/0249999 | A1 | 10/2008 | Renders et al. |
| 2009/0240539 | A1 | 9/2009 | Slawson et al. |
| 2009/0326919 | A1 | 12/2009 | Bean |
| 2011/0004578 | A1 | 1/2011 | Momma et al. |
| 2011/0213804 | A1 | 9/2011 | Lee et al. |
| 2011/0307422 | A1 | 12/2011 | Drucker et al. |
| 2012/0023006 | A1 | 1/2012 | Roser et al. |
| 2012/0117082 | A1 | 5/2012 | Koperda et al. |
| 2012/0173477 | A1 | 7/2012 | Coutts et al. |
| 2012/0215727 | A1 | 8/2012 | Malik et al. |
| 2013/0031489 | A1 | 1/2013 | Gubin et al. |
| 2013/0066818 | A1 | 3/2013 | Assadollahi et al. |
| 2013/0238533 | A1 | 9/2013 | Virkar et al. |
| 2014/0075004 | A1 | 3/2014 | Van Dusen et al. |
| 2014/0156567 | A1 | 6/2014 | Scholtes |
| 2014/0172416 | A1 | 6/2014 | Soroker et al. |
| 2014/0172417 | A1 | 6/2014 | Monk, II et al. |
| 2014/0201838 | A1 | 7/2014 | Varsanyi et al. |
| 2014/0278755 | A1 | 9/2014 | Eberl et al. |
| 2014/0280238 | A1 | 9/2014 | Cormack et al. |
| 2014/0370480 | A1 | 12/2014 | Sugibuchi et al. |
| 2015/0032645 | A1 | 1/2015 | McKeown et al. |
| 2015/0120373 | A1 | 4/2015 | Bajaj et al. |
| 2015/0254330 | A1 | 9/2015 | Chan et al. |
| 2015/0278730 | A1 | 10/2015 | Goldsmith et al. |
| 2015/0294246 | A1 | 10/2015 | Guven Kaya et al. |
| 2015/0339572 | A1 | 11/2015 | Achin et al. |
| 2015/0379429 | A1 | 12/2015 | Lee et al. |
| 2016/0048655 | A1 | 2/2016 | Maitra et al. |
| 2016/0071022 | A1 | 3/2016 | Bruno et al. |
| 2016/0117589 | A1 | 4/2016 | Scholtes |
| 2016/0162802 | A1 | 6/2016 | Chickering et al. |
| 2016/0358099 | A1 | 12/2016 | Sturlaugson et al. |
| 2017/0076304 | A1 | 3/2017 | Toth et al. |
| 2017/0124487 | A1 | 5/2017 | Szeto et al. |
| 2017/0308985 | A1 | 10/2017 | Grom et al. |
| 2018/0039911 | A1 | 2/2018 | Bezzubtseva et al. |
| 2018/0053114 | A1 | 2/2018 | Adjaoute |
| 2018/0150454 | A1 | 5/2018 | Sharma et al. |
| 2018/0268506 | A1 | 9/2018 | Wodetzki et al. |
| 2018/0357714 | A1 | 12/2018 | So et al. |
| 2019/0339684 | A1 | 11/2019 | Cella et al. |
| 2020/0302016 | A1 | 9/2020 | Aggarwal et al. |

OTHER PUBLICATIONS

Lauritsen, Marc, and Thomas F. Gordon. "Toward a general theory of document modeling." In Proceedings of the 12th international conference on artificial intelligence and law, pp. 202-211. 2009.) (Year: 2009).*

Office Communication for U.S. Appl. No. 15/949,905 mailed Jun. 27, 2018, pp. 1-19.

Vellido, Alfredo et al., "Making machine learning models interpretable", ESANN 2012 proceedings, European Symposium on Artificial Neural Networks, Computational Intelligence and Machine Learning. Bruges (Belgium), Apr. 25-27, 2012, pp. 163-172.

Office Communication for U.S. Appl. No. 15/949,905 mailed Nov. 7, 2018, pp. 1-30.

Office Communication for U.S. Appl. No. 16/231,886 mailed Feb. 28, 2019, pp. 1-24.

Github, Inc., Accord Project—Specification, Template Specification, "https://github.com/accordproject/techdocs/blob/master/docs/accordproject-specification.md." accessed Sep. 2018, pp. 1-11.

Office Communication for U.S. Appl. No. 16/231,886 mailed Jun. 21, 2019, pp. 1-23.

International Search Report and Written Opinion for International Patent Application No. PCT/US2019/026850 mailed Aug. 1, 2019, pp. 1-9.

Office Communication for U.S. Appl. No. 16/279,974 mailed Jul. 10, 2019, pp. 1-29.

Office Communication for U.S. Appl. No. 16/231,842 mailed Jul. 29, 2019, pp. 1-10.

Freund, Yoav et al., "An Efficient Boosting Algorithm for Combining Preferences", Journal of Machine Learning Research, vol. 4, 2003, pp. 933-969.

Gibaja, Eva et al., "A Tutorial on Multilabel Learning", ACM Computing Surveys, vol. 47, No. 3, Article 52, Apr. 2015, pp. 52:1-52:38.

Office Communication for U.S. Appl. No. 16/279,974 mailed Jan. 10, 2020, pp. 1-31.

Office Communication for U.S. Appl. No. 16/231,842 mailed Feb. 4, 2020, pp. 1-12.

International Search Report and Written Opinion for International Patent Application No. PCT/US2019/066986 mailed Mar. 17, 2020, pp. 1-8.

Office Communication for U.S. Appl. No. 16/279,974 mailed Apr. 3, 2020, pp. 1-4.

Office Communication for U.S. Appl. No. 16/231,842 mailed May 7, 2020, pp. 1-6.

Sun, Shiliang et al., "A Review of Natural Language Processing Techniques for Opinion Mining Systems", Information Fusion 26, 2017, pp. 10-25.

Office Communication for U.S. Appl. No. 16/279,974 mailed May 14, 2020, pp. 1-9.

Catal, Cagatay et al., "A Systematic Review of Software Fault Prediction Studies." Expert Systems With Applications, vol. 37, No. 4, 2009, pp. 7346-7354.

International Search Report and Written Opinion for International Patent Application No. PCT/US2020/018148 mailed Jul. 7, 2020, pp. 1-7.

Office Communication for U.S. Appl. No. 16/940,233 mailed Sep. 25, 2020, pp. 1-15.

Office Communication for U.S. Appl. No. 16/231,842 mailed Jan. 8, 2021, pp. 1-7.

Office Communication for U.S. Appl. No. 16/940,233 mailed Feb. 26, 2021, pp. 1-18.

Office Communication for U.S. Appl. No. 16/940,233 mailed May 7, 2021, pp. 1-5.

Office Communication for U.S. Appl. No. 16/940,233 mailed Jun. 25, 2021, pp. 1-11.

Tsai, Ming-Feng et al., "On the risk prediction and analysis of soft information in finance reports," European Journal of Operational Research, 2017, vol. 257, pp. 243-250.

Office Communication for U.S. Appl. No. 17/538,852 mailed Feb. 9, 2022, pp. 1-20.

Office Communication for U.S. Appl. No. 17/538,852 mailed Mar. 28, 2022, pp. 1-9.

Office Communication for U.S. Appl. No. 17/838,580 mailed Aug. 16, 2022, pp. 1-30.

* cited by examiner

AUTOMATED TRAINING AND SELECTION OF MODELS FOR DOCUMENT ANALYSIS

CROSS-REFERENCE TO RELATED APPLICATION

This Utility patent application is a Continuation of U.S. patent application Ser. No. 16/231,842 filed on Dec. 24, 2018, now U.S. Pat. No. 10,936,974 issued on Mar. 2, 2021, the benefit of which is claimed under 35 U.S.C. § 120, and the contents of which is further incorporated in entirety by reference.

TECHNICAL FIELD

The present invention relates generally to document management, and more particularly, but not exclusively, to analyzing documents and contracts.

BACKGROUND

Modern organizations are often required to enter into complex or expansive contracts between each other, vendors, suppliers, clients, or the like. In some cases, complex contracts may require a significant amount of effort to establish between parties. This effort may include common activities, such as, term negotiating, back-and-forth review, local government approval, or the like. Likewise, some contracts having particular characteristics, such as, parties, subject matter, locale, terms, value/cost, or the like, may be more likely to result in successful outcomes than some other contracts having different characteristics. For example, a routine service or production contract between two domestic organizations may have less risk than a contract to provide a raw material from a remote area prone to local disruption (e.g., political upheaval, logistical problems, extreme weather events, or the like). Often, organizations may have little insight into how the many characteristics of a complex contract, such as, parties, political conditions, choice of law, venues, forums, geographic locale, subject matter, value/cost, or the like, may impact the process of obtaining an executed contract as well as how contract characteristics impact the likelihood of contract performance. Accordingly, in some cases, it may be difficult for organizations to predict the time or effort it may take to obtain a particular contract. Likewise, it may be difficult for organizations to predict the potential of non-performance for mitigation planning. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
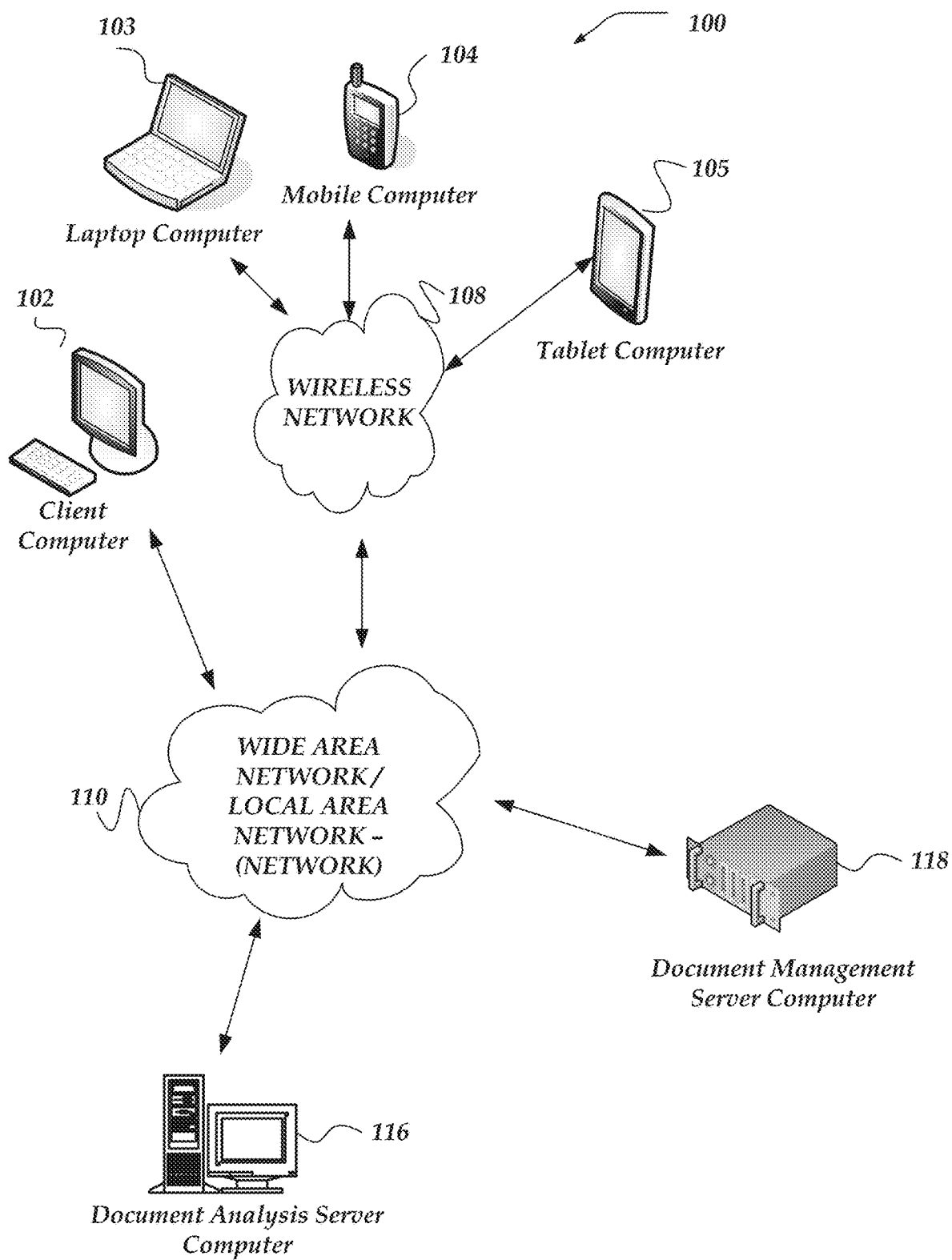
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, Kotlin, PHP, Perl, JavaScript, Ruby, VBScript, Microsoft .NET™ languages such as C #, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine. Also, in some embodiments, one or more portions of an engine may be a hardware device, ASIC, FPGA, or the like, that performs one or more actions in the support of an engine or as part of the engine.

As used herein the term, "evaluator" refers to a package or bundle of computer readable instructions, configuration information, rules, patterns, regular expressions, condition logic, branching logic, software libraries, FPGAs, ASICs, or the like, or combination thereof that may be used to evaluate documents or document clauses. In some cases, evaluators may be used determine characteristics about a contract including one or more attributes or features of the contract. Various evaluators may be specialized for identifying or validating one or more categories of clauses or validating one or more document or contract types. In some embodiments, organizations or users may provide custom evaluators to identify clause categories or document types that may be unique to their organization.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing documents over a network. In one or more of the various embodiments, a machine learning engine may be instantiated to determine one or more of training documents and one or more validation documents that are randomly selected from a plurality of documents.

In one or more of the various embodiments, the machine learning engine may be arranged to determine one or more attributes that may be associated with the plurality of documents such that the one or more attributes may be associated with one or more features that may be associated with the plurality of documents.

In one or more of the various embodiments, the machine learning engine may be arranged to determine one or more categorical attributes that have values that are names or labels; and determine one or more numerical attributes that may have values that represent a numerical meaning. In some embodiments, the one or more attributes may include one or more of value, number of cycle day, geographic location, subject matter, duration, delivery date, entities, forum, venue, or the like.

In one or more of the various embodiments, the machine learning engine may be arranged to perform further actions in response to receiving a request to predict one or more attribute values of a selected document.

In one or more of the various embodiments, the machine learning engine may be arranged to train a plurality of ML models to predict the one or more attribute values based on the one or more training documents and the one or more attributes such that each trained ML model may be associated with a training accuracy score. In one or more of the various embodiments, one or more of the plurality of ML models may be either fully trained or partially trained prior to receiving the request.

In one or more of the various embodiments, the machine learning engine may be arranged to determine one or more candidate ML models from the plurality of trained ML models based on each associated training accuracy score exceeding a threshold value.

In one or more of the various embodiments, the machine learning engine may be arranged to evaluate the one or more candidate ML models based on the request and the one or more validation documents such that each of the one or more evaluated candidate ML models may be ranked. In one or more of the various embodiments, determining the one or more candidate ML models may include, in response to the request matching one or more previous requests, modifying the set of one or more candidate ML models to include one or more confirmed ML models that were previously used for answering the one or more matched requests.

In one or more of the various embodiments, the machine learning engine may be arranged to generate one or more confirmed ML models based on the one or more ranked candidate ML models such that the one or more confirmed ML models may be employed to answer the request and predict the one or more attribute values of the selected document, and such that employing the one or more confirmed ML models improves both efficiency of employed computing resources and accuracy of the answer to the request.

In one or more of the various embodiments, the machine learning engine may be arranged to provide one or more document types based on a selection of attributes or attribute values such that each document may be associated with the one or more document types based on the one or more attributes included in the document; and, in some embodiments, associating one or more of the plurality of ML models with the one or more document types.

In one or more of the various embodiments, the machine learning engine may be arranged to execute the one or more confirmed ML models to identify which of the one or more attributes of the document may be outliers.

In one or more of the various embodiments, the machine learning engine may be arranged to execute the one or more confirmed ML models to identify one or more document clusters based on the one or more attributes such that the plurality of documents are associated with the one or more clusters based on values of the one or more attributes that are associated with each cluster of documents.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)–(network) 110, wireless network 108, client computers 102-105, document analysis server computer 116, document management server computer 118, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CSS), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, document analysis server computer 116, document management server computer 118, or other computers.

Client computers 102-105 may further be configured to include a client application that enables an end-user to log into an end-user account that may be managed by another computer, such as document analysis server computer 116, document management server computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by document analysis server computer 116.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, document analysis server computer 116, document management server computer 118, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of document analysis server computer 116, document management server computer 118 are described in more detail below in conjunction with FIG. 3. Although FIG. 1 illustrates document analysis server computer 116, document management server computer 118 each as a single computer, the innovations or embodiments are not so limited. For example, one or more functions of document analysis server computer 116, document management server computer 118, or the like, may be distributed across one or more distinct network computers. Moreover, in one or more embodiments, document analysis server computer 116, document management server computer 118 may be implemented using a plurality of network computers. Further, in one or more of the various embodiments, document analysis server computer 116, document management server computer 118, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
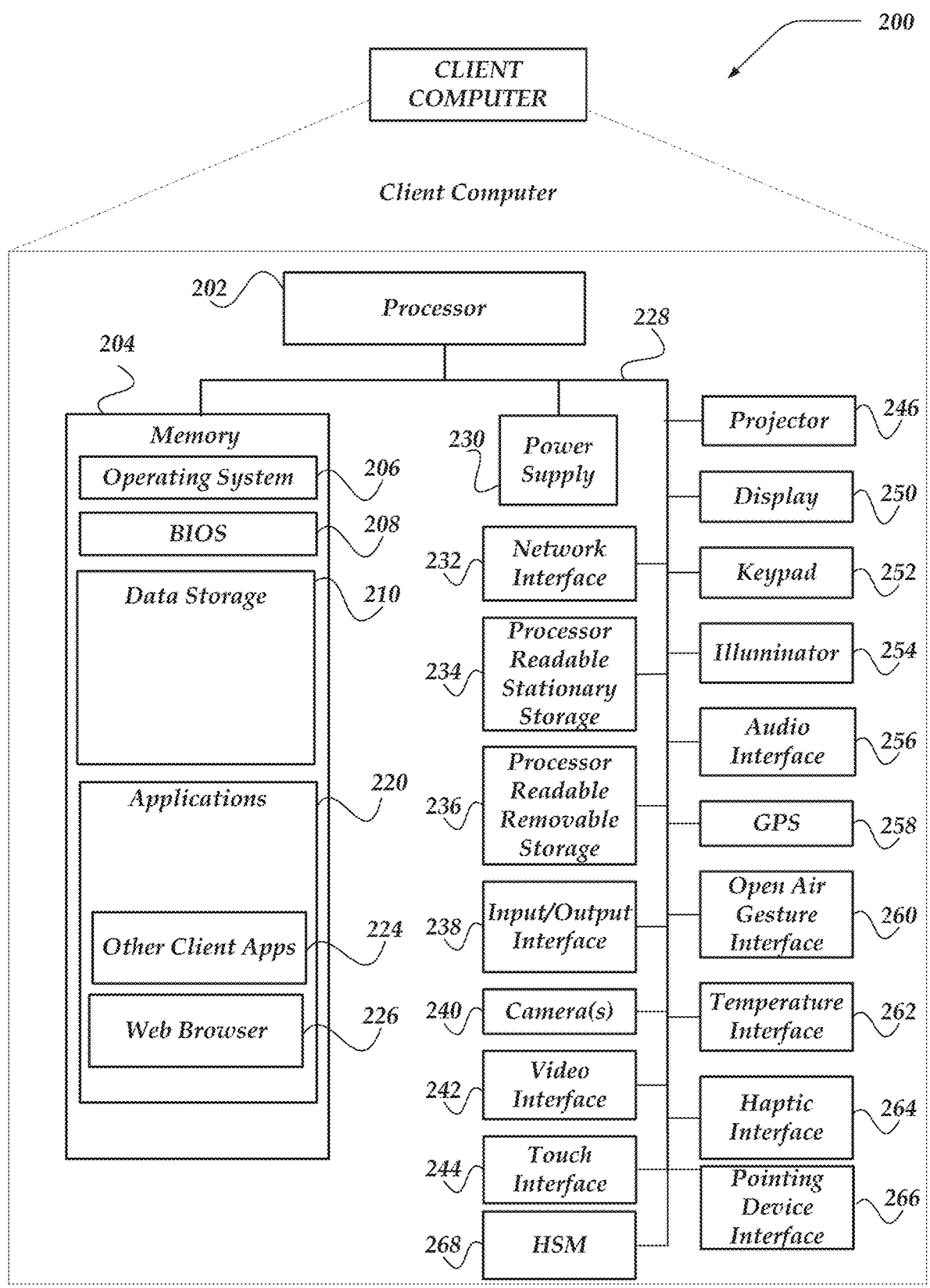
FIG. 2 illustrates a schematic embodiment of a client computer.

FIG. 2 shows one embodiment of client computer 200 that may include many more or less components than those shown. Client computer 200 may represent, for example, one or more embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (NIC).

Audio interface 256 may be arranged to produce and receive audio signals such as the sound of a human voice. For example, audio interface 256 may be coupled to a speaker and microphone (not shown) to enable telecommunication with others or generate an audio acknowledgement for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may backlight the buttons on keypad 252 and stay on while the client computer is powered. Also, illuminator 254 may backlight these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiment, however, client computer 200 may, through other components, provide other information that may be employed to determine a physical location of the client computer, including for example, a Media Access Control (MAC) address, IP address, and the like.

In at least one of the various embodiments, applications, such as, operating system 206, other client apps 224, web browser 226, or the like, may be arranged to employ geo-location information to select one or more localization features, such as, time zones, languages, currencies, calendar formatting, or the like. Localization features may be used in documents, clauses, evaluators, machine learning models, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, other client applications 224, web browser 226, or the like. Client computers may be arranged to exchange communications, such as, document management operations, document administration, document evaluation, document clause discovery, queries, searches, messages, notification messages, event messages, alerts, performance metrics, log data, API calls, or the like, combination thereof, with document analysis server computers or document management server computers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware microcontrollers instead of CPUs. In one or more embodiment, the one or more microcontrollers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
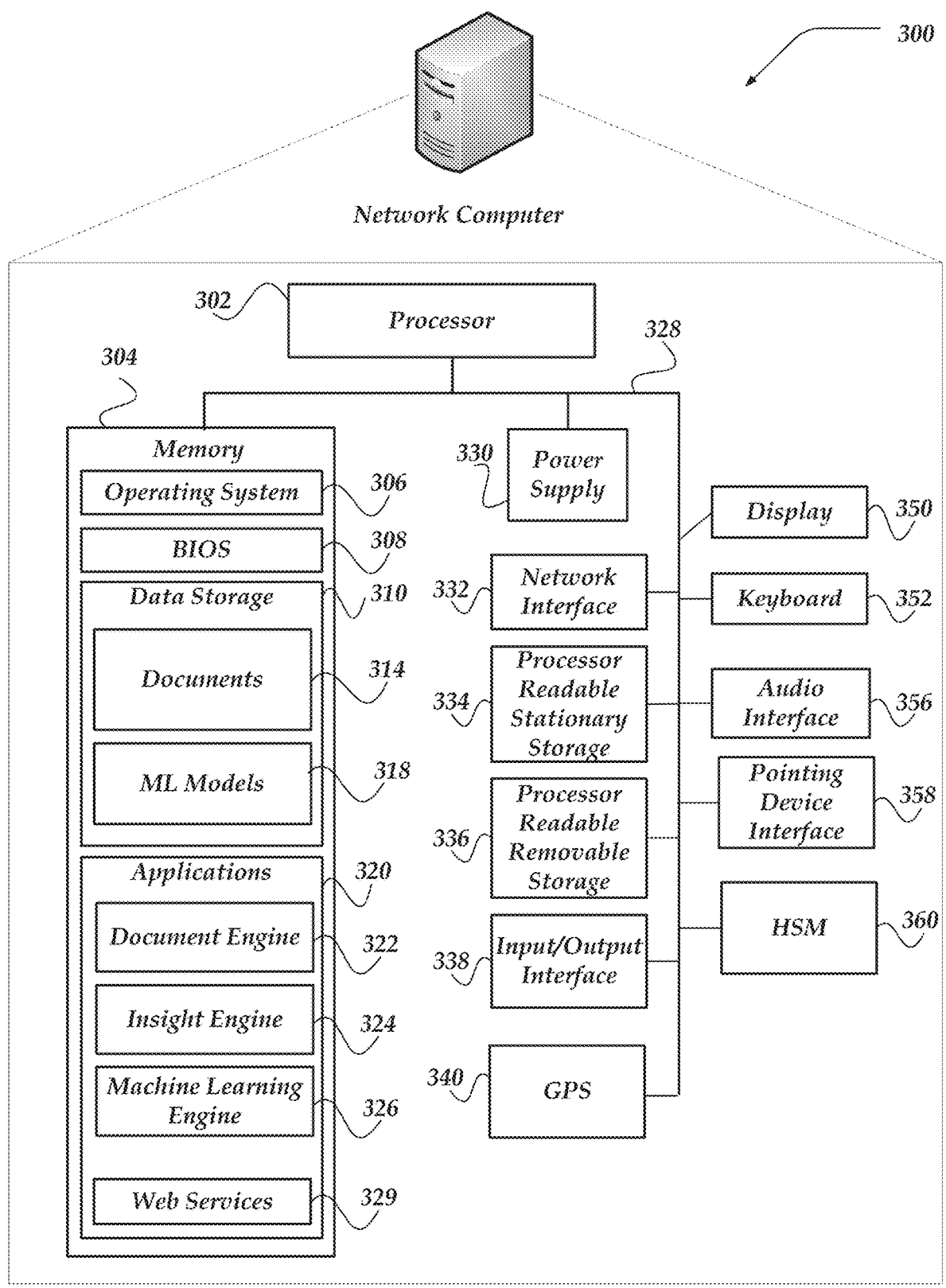
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of document analysis server computer 116, or document management server computer 118 of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgement for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, document engine 322, insight engine 324, machine learning engine 326, web services 329, or the like, may be arranged to employ geo-location information to select one or more localization features, such as, time zones, languages, currencies, currency formatting, calendar formatting, or the like. Localization features may be used in documents, clauses, clause meta-data, file systems, user-interfaces, reports, textual evaluators, semantic evaluators, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's OSX® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, documents 314, machine learning models 318, or the like. Documents 314 may store files, documents, versions, properties, meta-data, data structures, or the like, that represent one or more portions of a document, including raw documents or documents that have undergone additional analysis such as clause discovery or insight analysis. Machine learning models 318 may store one or more machine learning models that may be trained for automated training and selection of models for document analysis. Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include document engine 322, insight engine 324, machine learning engine 326, web services 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, document engine 322, insight engine 324, machine learning engine 326, web services 329, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to document engine 322, insight engine 324, machine learning engine 326, web services 329, or the like, may be provisioned and de-commissioned automatically.

Also, in one or more of the various embodiments, document engine 322, insight engine 324, machine learning engine 326, web services 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employ to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiment, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
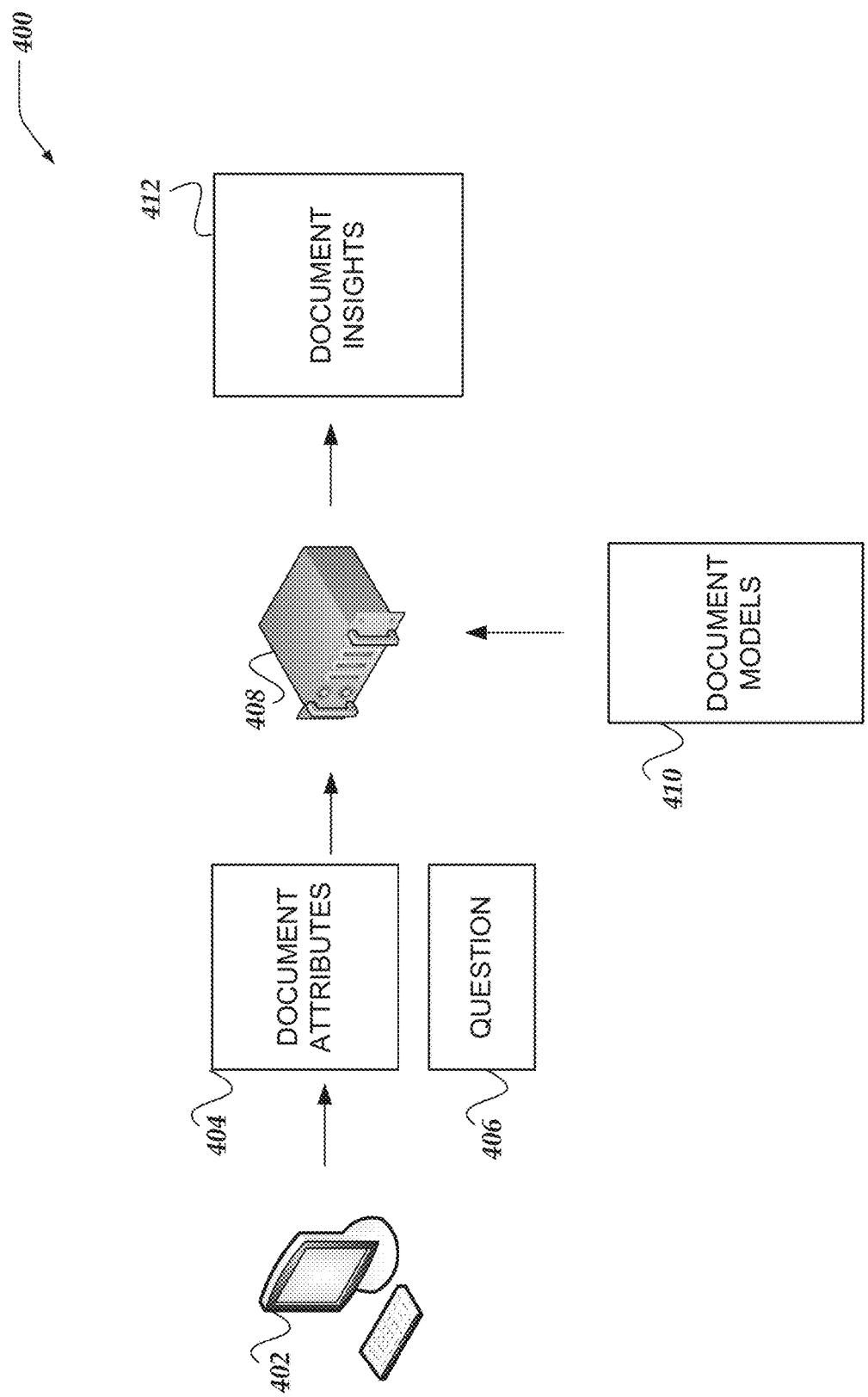
FIG. 4 illustrates a logical schematic of a system for automated training and selection of models for document analysis in accordance with one or more of the various embodiments.

FIG. 4 illustrates a logical schematic of system 400 for automated training and selection of models for document analysis in accordance with one or more of the various embodiments. In one or more of the various embodiments, one or more users may employ a client computer, such as, client computer 402 to provide a set of document attributes and one or more questions, such as, document attributes 404 or question 406 to a machine learning engine, or the like, running on a document management server computer, such as, network computer 408. Accordingly, in some embodiments, the machine learning engine may be arranged to select one or more document models, such as, document models 410 for training to answer question 406 based on attributes 404 and a corpus of other documents.

In one or more of the various embodiments, system 400 may be arranged to answer various kinds of questions about a document or its attributes. In some embodiments, document attributes 404 may include one or more the values of known attributes and question 406 may be asking for system 400 to provide a predicted value for an unavailable or unknown attribute. In some embodiments, question 406 may include a request for system 400 to determine if some or all of the values for attributes 404 may be anomalous. Also, in some embodiments, question 406 may include a request to provide other or additional statistical evaluations or comparisons of attributes 404 with similar attributes for other documents, such as, clustering, anomaly identification, or the like, or combination thereof.

In one or more of the various embodiments, system 400 may be arranged to train one or more machine learning models, such as, document models 410 to answer queries, such as, question 406 to provide insights 412 associated with one or more working documents. In one or more of the various embodiments, queries or questions may include providing one or more known values for one or more document attributes and one or more document attributes with unknown values. For example. In some embodiments, system 400 may provide a predicted value for the one or more documents attributes without values. In some embodiments, document insights 412 may include one or more predicted values for one or more document attributes to provide users insight into their business processes or operations based on the predictions.

For example, in some embodiments, contract document may have several attributes that may provide insight into how long it may take to execute or finalize the agreement between the contracting parties. Likewise, in some embodiments, insights may include: risk assessments, identifying similar documents (e.g., clustering), identifying anomalous documents, or the like, or combination thereof.

In some embodiments, system 400 may be arranged to selectively train one or more candidate ML models to answer the same query (e.g., question 406). Accordingly, in some embodiments, the ML models may be compared or otherwise ranked based on an accuracy score associated with their respective predictions. In some embodiments, the particular training method or scoring method may vary depending on the ML model.

In one or more of the various embodiments, the different ML models may include models arranged to use different training techniques or statistical techniques, including, linear regression, lasso regression, ridge regression, decision tree, random forest, logistic regression, or the like, or combination thereof. Further, in some embodiments, various heuristic methods or processes may be employed as well. In some embodiments, a system, such as, system 400 may be arranged to employ configuration information, such as, rule based policies, pre-defined feature weights, pattern matching, scripts (e.g., computer readable instructions), or the like, to select candidate ML model to train to answer a given query for a set of document attributes. In some embodiments, this configuration information may be provided from various sources, including, configuration files, databases, user input, built-in defaults, or the like, or combination thereof.

In one or more of the various embodiments, the trained candidate ML models may be further evaluated to rank them against each other by running them against a set of validation documents. Accordingly, in some embodiments, one or more of the top ranked ML models may be selected to provide an answer in response to questions, such as, question 406 based on document attributes, such as, document attributes 404.

Figure 5:
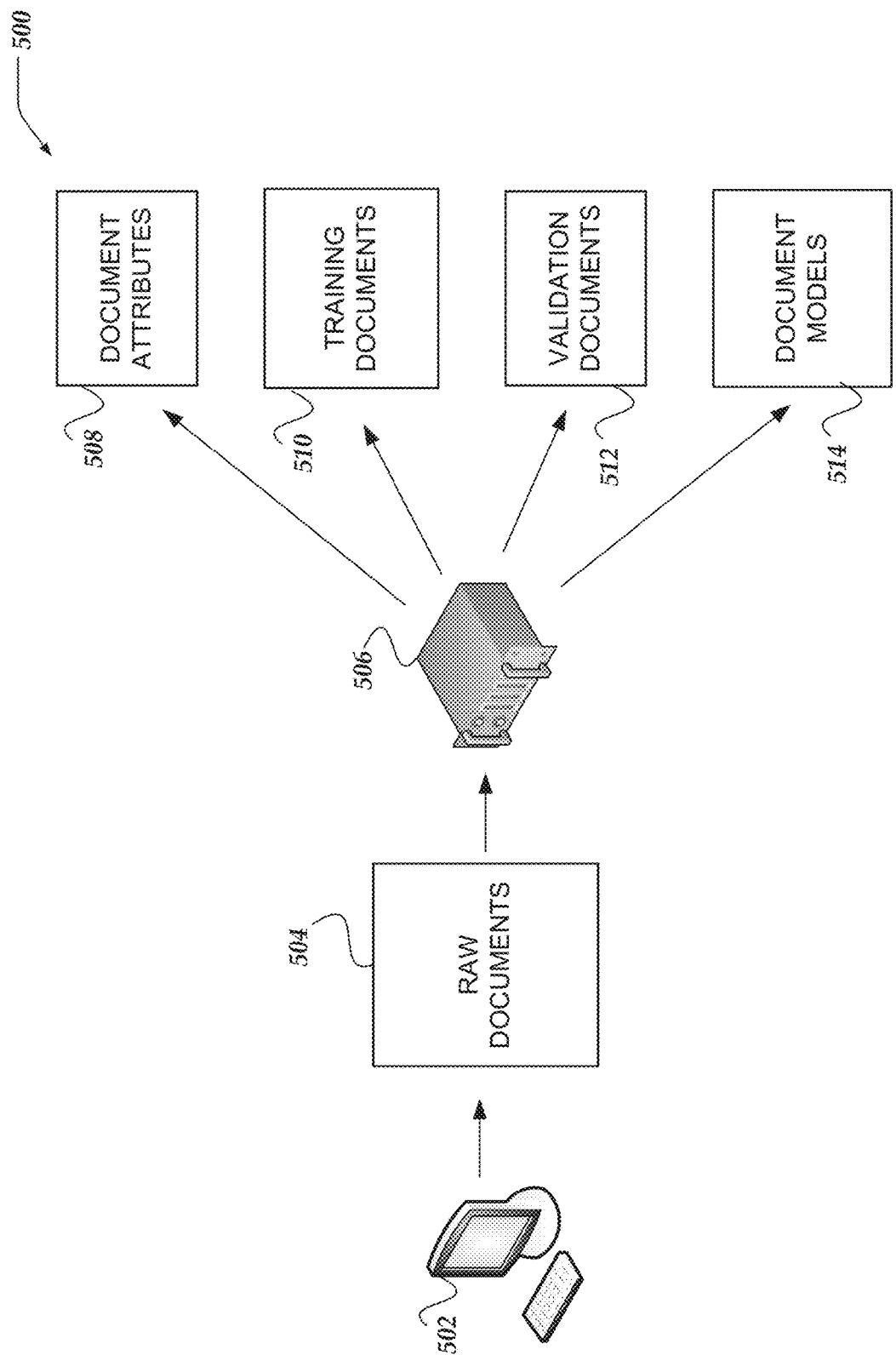
FIG. 5 illustrates a logical schematic of a system for automated training and select of models for document or contract analysis in accordance with one or more of the various embodiments.

FIG. 5 illustrates a logical schematic of system 500 for automated training and select of models for document or contract analysis in accordance with one or more of the various embodiments. As described above, in some embodiments, an organization may employ one or more computers, such as, computer 502, to provide a corpus of documents to a document analysis server computer, such as, document analysis server computer 506. Accordingly, in one or more of the various embodiments, one or more of a document engine, insight engine, machine learning engine, or the like, may be arranged to pre-process the documents to identify attributes or features or the documents that may be suitable for using, such as, document attributes 508, or the like.

Also, in one or more of the various embodiments, some or all or the original documents (e.g., documents 504) may be divided into validation documents and training documents. For example, in some embodiments, the document engine, or the like, may be arranged to randomly select 25% of the document corpus to be validation document set with the 75% remainder being used as the training document set. Thus, in some embodiments, the ML models may be trained using a training set, such as, training documents 510. And, in some embodiments, a validation set, such as, validation documents 512 may be used to evaluate and rank the one or more candidate ML models.

In one or more of the various embodiments, document models 514 represents the models used for answering queries or questions. In some embodiments, models 514 may include, one or more machine learnings models, one or more model templates, one or more partially trained/configured models, or the like.

In some embodiments, the document corpus needs to be pre-processed for the purpose of analysis. In some embodiments, the pre-processing may include one or more data mining techniques that may resolves issues, such as, incomplete or inconsistent data. In some embodiments, the document engine may be arranged to determine if a document attribute may be numeric or categorical. In some embodiments, a numerical attribute may be an attribute where the measurement or number has a numerical meaning. For example, "total contract value", "number of cycle days" may be examples of numerical attributes. In contrast, categorical attributes may take on values that may be names or labels. For example, "country", "state" are examples of categorical attributes.

Further, in one or more of the various embodiments, the document engine may be arranged to determine if an attribute has valid data for the purpose of analysis. Accordingly, in some embodiments, the document engine may be arranged to execute one or more sanity check operations to determine if an attribute type or feature is suitable for analysis. For example, if the data for a categorical attribute contains more than 90% unique values or a particular value occurs more than 90% of the total count, the attribute might not be considered suitable for the purpose of analysis. Similarly, in some embodiments, for a numerical attribute, if a particular value occurs more than 90% of the total count, the attribute might not be considered suitable for analysis. Also, in some embodiments, records with missing values in dependent variables (attributes for which prediction is needed) may be discarded. Alternatively, in some embodiments, some records may have values missing for certain attributes. In some embodiments, the document engine may be arranged to employ one or more statistical methods, such as, mean, mode, or the like, for numeric values attributes or most common values for categorically valued attributes to impute missing values.

Generalized Operations

FIGS. 6-9 represent generalized operations for automated training and selection of models for document or contract analysis in accordance with one or more of the various embodiments. In one or more of the various embodiments, processes 600, 700, 800, and 900 described in conjunction with FIGS. 6-9 may be implemented by or executed by one or more processors on a single network computer (or network monitoring computer), such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 6-9 may be used automated training and selection of models for document or contract analysis in accordance with at least one of the various embodiments or architectures such as those described in conjunction with FIGS. 4-5. Further, in one or more of the various embodiments, some or all of the actions performed by processes 600, 700, 800, and 900 may be executed in part by document engine 322, insight engine 324, or machine learning engine 326 running on one or more processors of one or more network computers.

Figure 6:
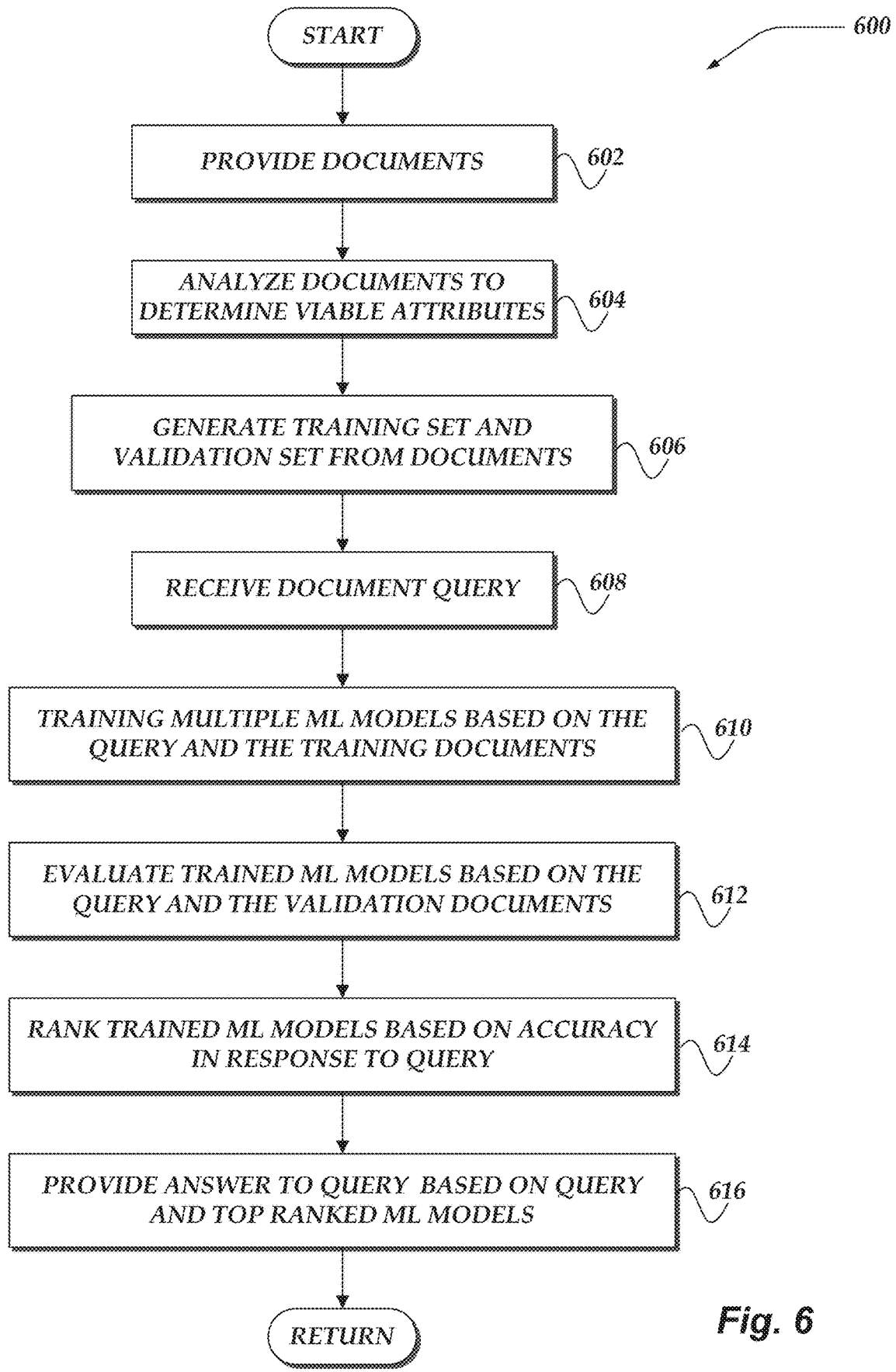
FIG. 6 illustrates an overview flowchart of a process for automated training and select of models for document or contract analysis in accordance with one or more of the various embodiments.

FIG. 6 illustrates an overview flowchart of process 600 for automated training and select of models for document or contract analysis in accordance with one or more of the various embodiments. After a start block, at block 602, in one or more of the various embodiments, various documents may be provided to a document engine. As described above, an organization may provide documents, including pending contracts, impending contracts, historical contracts, archived contracts, or the like, as well as various related or supporting documents, including, work orders, invoices, letters of intent, job/work descriptions, other documents, or the like.

In one or more of the various embodiments, the organization may provide digital copies of some or all of the documents. For example, some or all of the documents may be provided via digital media. Alternatively, or concurrently, in some embodiments, the organization may share access to some or all of the documents with the document engine. For example, in some embodiments, an organization may provide a document engine access to document management tools that enable the document engine to access the documents.

At block 604, in one or more of the various embodiments, the document engine may be arranged to analyze the documents to identify one or more document attributes that may be suitable for training models that may be suitable for answering user queries directed to new or existing documents.

At block 606, in one or more of the various embodiments, the document engine may be arranged to divide the documents into training documents and validation documents. For example, in some embodiments, the document engine may be arranged to randomly assign 75% of the documents to the training set and assign the 25% remainder to a validation set.

In some embodiments, document engine may be arranged to execute one or more rules or heuristics that consider one or more attributes or characteristics of a document to determine whether to assign it to the training set or a validation set. Likewise, in some embodiments, the document engine may be arranged to execute rules or heuristics that may exclude one or more documents from either set based on one or more characteristics of the excluded documents, such as, document age, document subject matter, document type, document author, contract parties, or the like. For example, in some embodiments, the document engine may be arranged to exclude old documents associated with a particular country that has under gone significant social, political, or economic disruption because the disruptions may cause one or more of the insights determined from the old contracts misleading. In some embodiments, a document engine may be arranged to employ configuration information, such as, rule based policies, pattern matching, scripts (e.g., computer readable instructions), or the like, to determine if a document may be assigned to a training set or a validation set. In some embodiments, this configuration information may be provided from various sources, including, configuration files, databases, user input, built-in defaults, or the like, or combination thereof.

At block 608, in one or more of the various embodiments, the document engine may receive a document query from a user. In some embodiments, the query may be provided to an insight engine, machine learning engine, or document engine, or the like. In some embodiments, the query may include one or more document attributes associated with a working document that may be under analysis by a user. In some embodiments, the query may include one or more document attributes of the working document that have known values and one or more document attributes from the working document that have unknown values. For example, a query may include five attributes with that have known values, such as, (A,_,C,D,E,F) to predict an unknown value for B.

At block 610, in one or more of the various embodiments, a machine learning engine may be arranged to train two or more machine learning models based on the query and the training documents. In one or more of the various embodiments, the machine learning engine may select two or more machine learning models from a pool of machine learning models. In some embodiments, one or more of the machine learning models may be partially or fully trained (pre-trained). Accordingly, in some embodiments, if the current query is a duplicate of a previous query there may be one or more previously trained machine learning models that may be available.

In one or more of the various embodiments, the machine learning engine may be arranged to select the one or more machine learning models from the pool of available machine learning models based on configuration information.

At block 612, in one or more of the various embodiments, the machine learning engine may be arranged to evaluate the trained machine learning models based on the query and the validation documents. In one or more of the various embodiments, the machine learning engine may be arranged to assign each trained machine learning model an accuracy score. The accuracy may be a normalized value that enables different types of machine learning models to be compared to each other. Accordingly, in one or more of the various embodiments, each type of machine learning model may be associated with an accuracy function that may be directed to that particular type of machine learning model. Further, in some embodiments, user preferences or other configuration information may be employed to modify or weight the accuracy score for one or more machine learning models. Accordingly, in some embodiments, users or operators may bias the accuracy score of one or more favored machine learning models.

At block 614, in one or more of the various embodiments, the machine learning engine may be arranged to rank the trained machine learning models based on their associated accuracy score. In one or more of the various embodiments, the machine learning engine may be arranged to associate an accuracy score with the machine learning models based on how successful they were when responding to the query. Accordingly, in some embodiments, the machine learning models may be ranked based on their respective accuracy scores.

At block 616, in one or more of the various embodiments, the machine learning engine may be arranged to provide a response to the query based on the query and one or more of the top ranked machine learning models. Next, control may be returned to a calling process.

Figure 7:
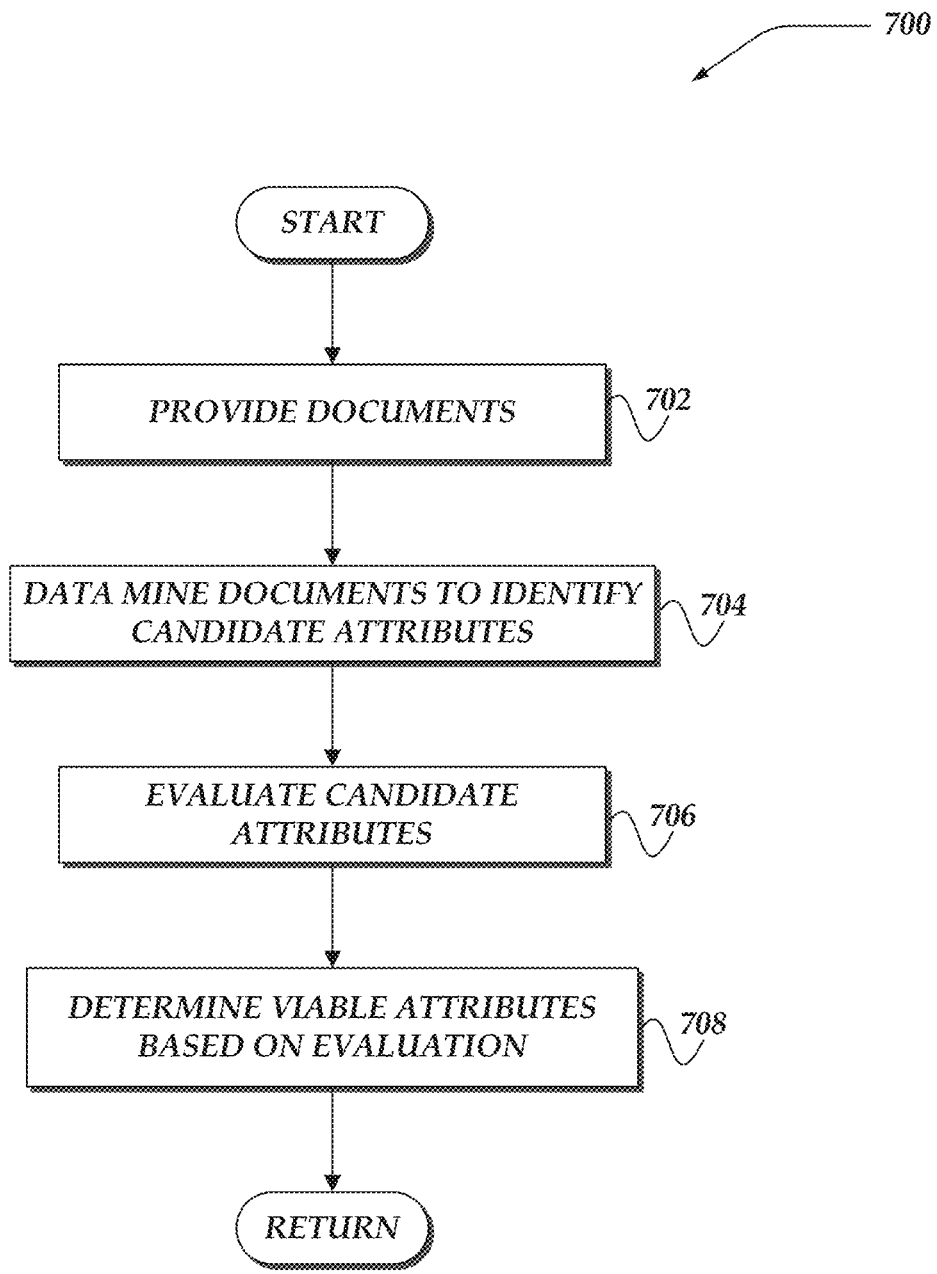
FIG. 7 illustrates a flowchart of a process for determining document attributes for automated training and select of models for document or contract analysis in accordance with one or more of the various embodiments.

FIG. 7 illustrates a flowchart of process 700 for determining document attributes for automated training and select of models for document or contract analysis in accordance with one or more of the various embodiments. After a start block, at block 702, in one or more of the various embodiments, a corpus of documents may be provided to document engine. In some embodiments, an organization may provide some or all of its documents to a document analysis platform, such as, document analysis server computer 116. In some embodiments, the organization may provide documents of one or more types, such as, contracts, license agreements, or the like.

As described above, documents may be provided in raw/original form or they may be provided after some amount of pre-processing. For example, in some embodiments, documents may be provided via integration with a document management system or contract management system that includes or maintains meta-data that may be relevant for determining one or more document attributes.

At block 704, in one or more of the various embodiments, the document engine may be arranged to data mine the provided documents to identify one or more candidate document attributes. In some embodiments, attributes may be considered features of the documents or its contents. In some embodiments, the available types of document attributes may be pre-defined based on the type document. In some embodiments, the document engine may be arranged to recognize one or more common document attributes, such as, author, parties, identification of various parts or clauses of documents, or the like. Also, in some embodiments, custom or attributes otherwise unique to an organization or its it documents may be defined as well. Accordingly, in one or more of the various embodiments, the document engine may be arranged to employ configuration information that defines one or more rules, conditions, pattern matching, or the like, that may be executed by the document engine to identify one or more candidate document attributes.

At block 706, in one or more of the various embodiments, the document engine may be arranged to evaluate the one or more candidate document attributes. As mentioned above, the document engine may be arranged to execute one or more heuristics, rules, computer readable instructions, or the like, to evaluate whether one or more document attributes are suitable for including in the modeling. In one or more of the various embodiments, one or more general or specific criteria may be evaluated to determine if a candidate document attribute is suitable for including in the modeling process. For example, in some embodiments, if a categorical attribute contains more than 90% unique values or a particular value occurs more than 90% of the total count, the attribute may not be considered for the purpose of analysis because it would not be useful for making predictions about the values of other document attributes.

At block 708, in one or more of the various embodiments, the document engine may be arranged to determine one or more viable document attributes based the evaluation of the candidate document attributes. Candidate document attributes that may be determined as suitable for modeling may be identified and made available as document attributes.

In one or more of the various embodiments, these attributes may be made available to other applications or user interfaces that users may be employ to form queries or questions to predict other document attributes. Next, control may be returned to calling process.

Figure 8:
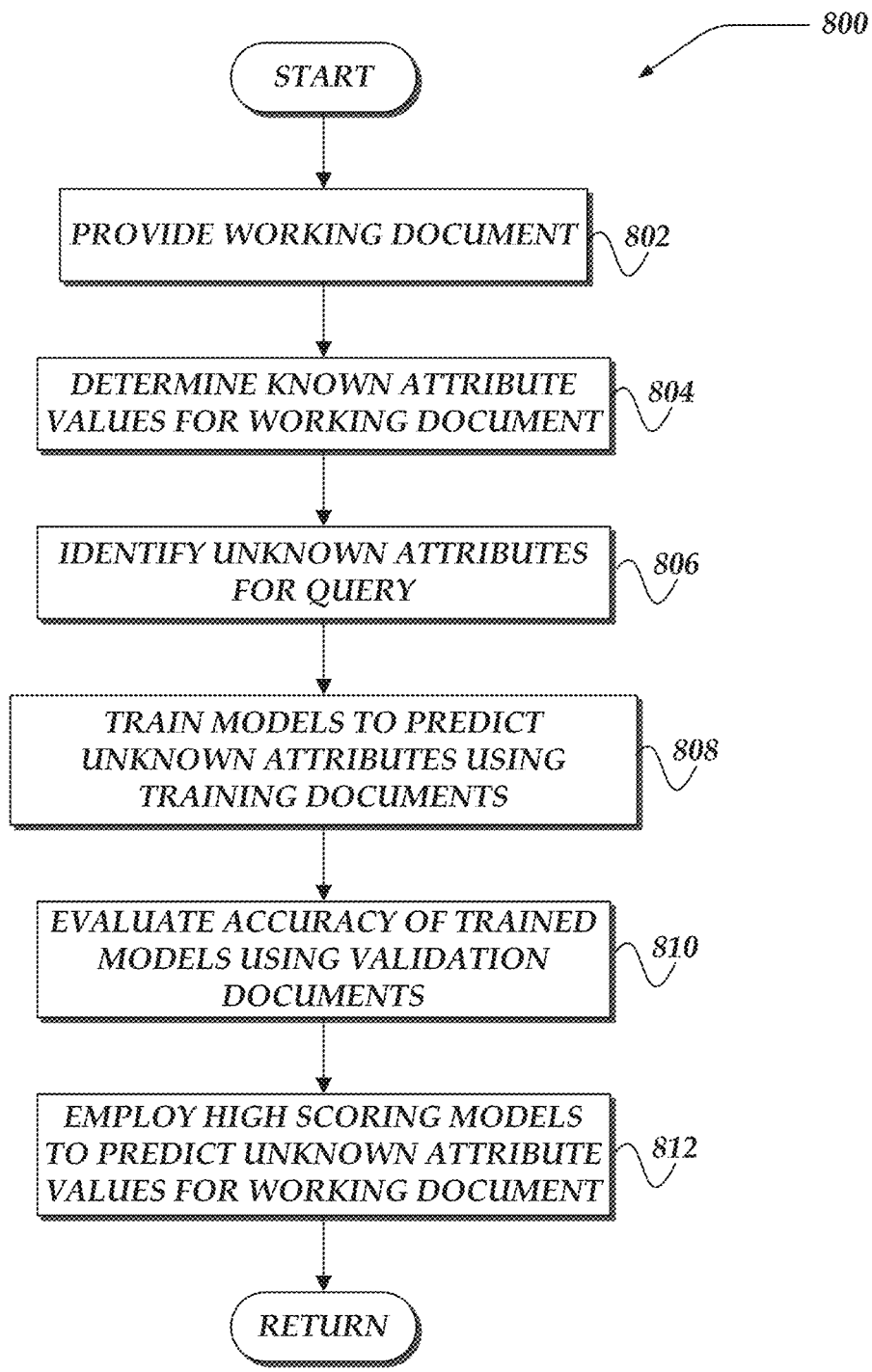
FIG. 8 illustrates a flowchart of a process for predicting unknown document attributes of a working document in accordance with one or more of the various embodiments.

FIG. 8 illustrates a flowchart of process 800 for predicting unknown document attributes of a working document in accordance with one or more of the various embodiments.

After a start block, at block 802, in one or more of the various embodiments, one or more working documents may be provided to the document engine. In some embodiments, a working document may be a document, such as, a contract, license, or the like, that a user may be researching or processing. For example, the working document may be a proposed contract presented during the negotiation of a deal between one or more parties. In some embodiments, working document may be finalized or otherwise in-force. Accordingly, in some embodiments, the working document may be a document of a known type that is being developed (e.g., negotiated) or one that has already been finalized.

In one or more of the various embodiments, the working document may be represented by a set of one or more document attributes rather than an actual document. For example, in some embodiments, a user performing a what-if analysis may provide a set of known or proposed document attributes rather than an actual document.

At block 804, in one or more of the various embodiments, the document engine may be arranged to determine one or more known document attribute values for the one or more working documents. In one or more of the various embodiments, the document engine may be arranged to scan or parse the working document to automatically discover one or more values for one or more document attributes of the working document. In some embodiments, the working document may be associated with meta-data that defines the relevant document attributes and the known values, if any. In some embodiments, the document engine may receive one or more document attributes or document attribute values from a user that may be analyzing the working document. In some embodiments, the document engine may identify one or more document attributes that are missing or have missing values.

At block 806, in one or more of the various embodiments, one or more document attributes of the working document that are missing values may be determined or identified. In some embodiments, the document engine may generate a user interface that enables one or more users to identify one or more unknown valued document attributes. Also, in one or more of the various embodiments, the document engine may be arranged to automatically determine one or more document attributes having unknown values. For example, in one or more of the various embodiments, a document engine may employ configuration information to determine one or more documents attributes with unknown values.

In one or more of the various embodiments, one or more of the determined unknown valued document attributes and the one or more known-valued document attributes may be included in a query that may be provided to a machine learning engine.

At block 808, in one or more of the various embodiments, the machine learning engine may be arranged to employ the training documents to train one or more machine learning models to predict values for the one or more document attribute having unknown values. As described above, in one or more of the various embodiments, there may be data store of one or more untrained machine learning models that represent various modeling or machine learning techniques.

Accordingly, in one or more of the various embodiments, the machine learning engine may be arranged to select two or more machine learning models and train them to predict values for the one or more unknown valued document attributes. In some embodiments, the machine learning engine may be arranged to select one or more particular untrained machine learning models based on a document type of the working document.

Also, in some embodiments, the machine learning engine may select untrained machine learning models based on the query inputs. In some embodiments, one or more document attributes or attribute sets may be associated with particular untrained machine learning models. For example, in some embodiments, categorically valued document attributes may be associated with different machine learning models than numerical valued or continuously valued document attributes.

In some embodiments, one or more particular document attributes or document attribute sets may be associated with definite known values. In such cases, the corresponding unknown values may be provided based on heuristics, lookups, well-known formulas, or the like, rather than requiring the use of machine learning models or the training thereof. Accordingly, in some embodiments, information regarding this direct mapping/computation of attribute values may be provided via configuration information. In some embodiments, some or all of the configuration information may be provided by various sources, including configuration files, configuration databases/registries, rule-based policies, computer readable instructions, built-in values, default values, user input, or the like, or combination thereof.

Also, in one or more of the various embodiments, one or more machine learning models may be fully trained or partially trained based on previous queries. Accordingly, in some embodiments, the one or more trained or partially trained machine learning model may be stored and indexed based on keys generated based on document types, question/query type (e.g., missing value prediction, clustering, anomaly detection, or the like), valued document attributes, unknown valued document attributes, or the like. Accordingly, in some embodiments, the pre-trained machine learning models may be included in the training process. Alternatively, in some embodiments, one or more of the pre-trained machine learning models may be omitted from training.

In one or more of the various embodiments, the machine learning engine may be arranged to perform one or more actions associated with the machine learning techniques associated with a given machine learning model. In some embodiments, there may be one or more other actions, including, customized processing, filters, heuristics, normalizations, or the like, that may be associated with one or more machine learning models. In some embodiments, one or more of these actions may be included in the training process for one or more machine learning models. Accordingly, in some embodiments, the machine learning engine may determine one or more training actions for given machine learning model based on configuration information.

At block 810, in one or more of the various embodiments, the machine learning engine may be arranged to evaluate the accuracy of the trained machine learning models using the validation documents. In one or more of the various embodiments, after the machine learning models have been trained using the training documents, the trained machine learning models may be tested using the validation documents. Each model may be scored based on how well it predicts the missing attributes or otherwise answers the query. For example, in some embodiments, an accuracy score may be computed based on one or more formulas that provide normalized scoring system. In some embodiments, the scoring formulas may be modified or otherwise tuned based on the type of machine learning model being evaluated.

At block 812, in one or more of the various embodiments, the document engine may be arranged to employ the high scoring machine learning models to predict one or more values for the unknown document attributes. In some embodiments, the document engine may rank the machine learning models based on their accuracy score. Accordingly, in one or more of the various embodiments, the document engine may select one or more of the top ranked machine learning models for use in answering the supplied query. For example, the highest ranked machine learning model may be used to predict the values for the one or more unknown valued document attributes of the working document. Next, control may be returned to a calling process.

Figure 9:
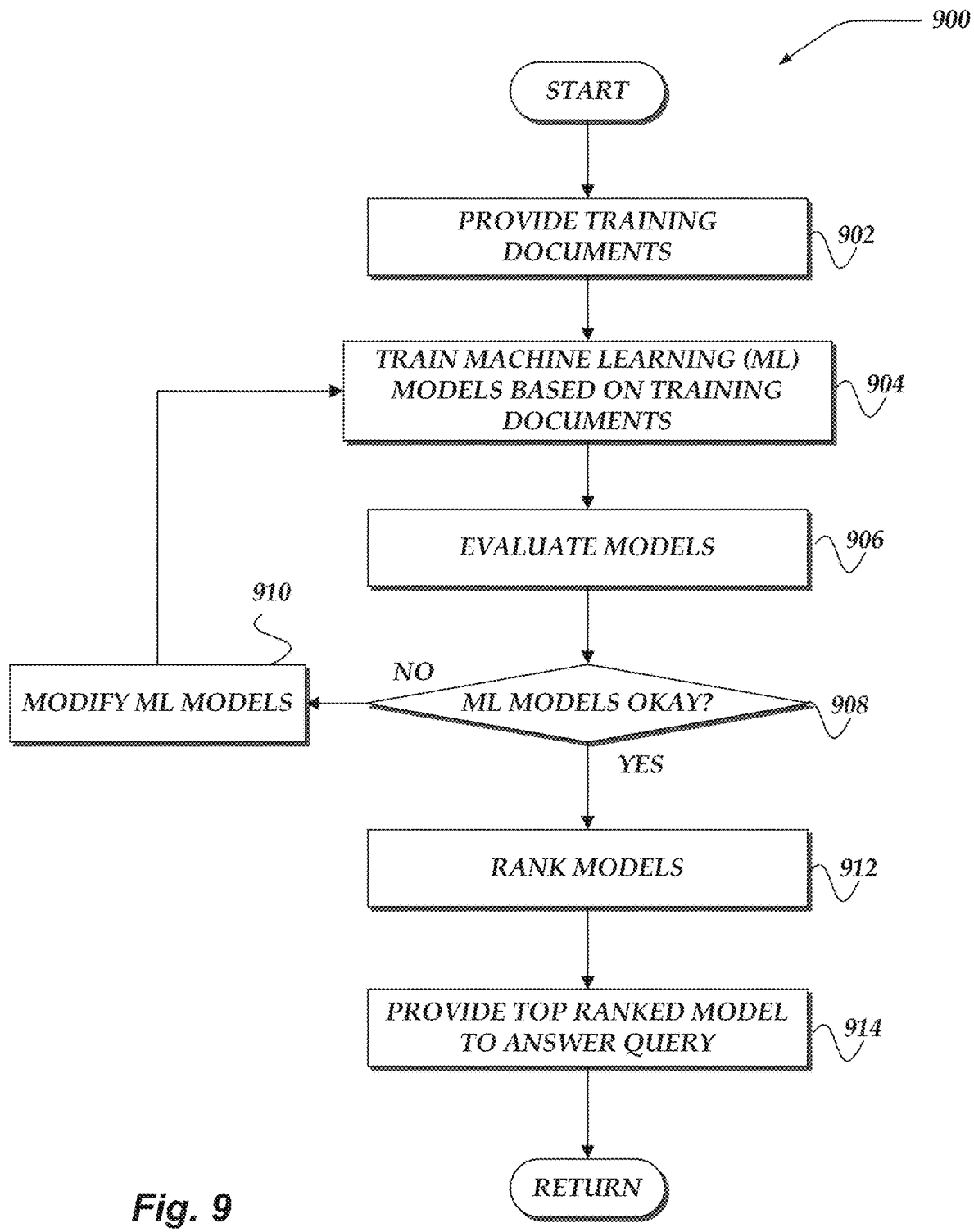
FIG. 9 illustrates a flowchart of a process for training machine learning models used for automated training and select of models for document or contract analysis in accordance with one or more of the various embodiments.

FIG. 9 illustrates a flowchart of process 900 for training machine learning models used for automated training and select of models for document or contract analysis in accordance with one or more of the various embodiments. After a start block, at block 902, in one or more of the various embodiments, a machine learning engine may be provided training data, such as, training documents that may be selected from a corpus of documents provided by an organization. In one or more of the various embodiments, a machine learning engine may be provided training data in the form of a large collection of documents of a known quality and a known document type.

In some embodiments, the training data may have previously been classified or evaluated. In one or more of the various embodiments, the training data may have been preprocessed by a document engine or machine learning engine as described above. Accordingly, in one or more of the various embodiments, the training data may include labels, tags, meta-data, document quality scores, or the like.

Accordingly, the documents in the training data may be associated with meta-data generated by the document engine during preprocessing. In some embodiments, the meta-data may include label information or document attribute information that may be used by the machine learning engine for training one or more machine learning (ML) models.

At block 904, in one or more of the various embodiments, the machine learning engine may be arranged to train one or more ML models using the training data. In some embodiments, training a machine learning model is the process of iteratively improving the machine learning model prediction results by looping or otherwise evaluating documents in the training set. In some embodiments, depending on the particular machine learning model, machine learning engines may be arranged to update one or more weights or bias values included in the machine learning model. In some embodiments, training may be complete if an acceptable error threshold is reached, or if subsequent training iterations fail to improve the accuracy of the machine learning model.

In one or more of the various embodiments, the training methods may depend on the type of ML model being trained. Accordingly, in some embodiments, the machine learning engine may be arranged to perform different training actions for different machine learning models. The particular training process or training instructions may be provided via configuration information. In some embodiments, some or all of the configuration information may be provided by various sources, including configuration files, configuration databases/registries, rule-based policies, computer readable instructions, built-in values, default values, user input, or the like, or combination thereof.

At block 906, in one or more of the various embodiments, the document engine or machine learning engine may be arranged to evaluate the trained machine learning model. In one or more of the various embodiments, a portion of the validation documents that may have known characteristics or document attributes may be evaluated using the machine learning models. Accordingly, in one or more of the various embodiments, machine learning models that predict the known document attributes of validation documents with an accuracy rate that exceeds a defined threshold value may be considered sufficiently trained. Note, in some embodiments, different machine learning models may be associated with different accuracy threshold values. For example, some machine learning model types may be intended for gross classification that does not require precise accuracy. In some embodiments, other machine learning models that may require increased accuracy or precision may be associated with threshold values that correspond to increased accuracy or precision.

At decision block 908, in one or more of the various embodiments, if the trained ML models are sufficiently trained, control may flow to block 912; otherwise, control may flow to block 910. In one or more of the various embodiments, a machine learning engine may be arranged to determine if a machine learning model is trained based on comparing one or more performance metrics associated with the machine learning model. The particular performance metrics may vary depending on the type of machine learning model. In some embodiments, the number of available inputs or the type of answer/response being sought may also influence the criteria or performance metrics for a given machine learning model. Accordingly, in one or more of the various embodiments, configuration information or metadata associated with a machine learning model may include rules, conditions, threshold values, or the like, that may be employed by the machine learning engine to determine if a machine learning model is sufficiently trained.

At block 910, in one or more of the various embodiments, the one or more of the ML models or one or more of the training routines may be modified. In one or more of the various embodiments, the machine learning engine may be arranged to automatically modify one or more parameters of the one or more ML models that require retraining. In other embodiments, the machine learning engine may enable data scientists to modify the ML models or select different ML models. Next, in some embodiments, control may loop back to block 904, to re-train the ML models.

At block 912, in one or more of the various embodiments, the machine learning engine may be arranged to ranks the trained machine learning model based on their accuracy scores. At block 914, in one or more of the various embodiments, the machine learning engine may be arranged to provide the top ranked machine learning model for answering a query provided by a user. Next, control may be returned to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiment, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patents of the United States is:

1. A method for managing contract documents over a network using one or more processors that execute instructions that cause performance of actions, comprising:
    instantiating an engine to perform actions, including:
        determining one or more of training contract documents and one or more validation contract documents that are randomly selected from a plurality of contract documents;
        employing a semantic evaluator and a textual evaluator to determine one or more attributes associated with the plurality of contract documents, wherein the one or more attributes are associated with one or more localization features that are associated with the plurality of contract documents;
        employing one or more of a geolocation device or a geolocation network protocol to determine geolocation information for a physical location;
        employing the semantic evaluator and the textual evaluator to use the one or more localization features to validate one or more of categories of contract clauses or contract document types for the physical location, and wherein the geolocation information is employed to select the one or more localization features, including a time zones, languages, currencies, currency formatting, or calendar formatting;
        determining one or more candidate models from a plurality of trained models based on each associated training accuracy score exceeding a threshold value, wherein the one or more candidate models are evaluated and ranked based on the request and the one or more validation contract documents; and
        generating one or more confirmed models based on the one or more evaluated and ranked candidate models, wherein the one or more confirmed models are employed to predict the one or more attribute values of a selected contract document, wherein employing the one or more confirmed models improves both efficiency of employed computing resources and accuracy of the prediction of the one or more attribute values.

2. The method of claim 1, further comprising:
training a plurality of models to predict the one or more attribute values based on the one or more training contract documents and the one or more attributes, wherein each trained ML model is associated with a training accuracy score.

3. The method of claim 1, further comprising:
identifying one or more candidate attributes in the plurality of contract documents, wherein the one or more candidate attributes include one or more of a feature, type, predefined, custom, commonly repeated, or content of the plurality of contract documents; and
determining the one or more attribute values based on evaluation of the one or more candidate attributes with configuration information.

4. The method of claim 1, further comprising:
employing the one or more confirmed models to identify the one or more attributes of the document that are outliers.

5. The method of claim 1, further comprising:
employing one or more high ranked candidate models to predict one or more unknown attribute values for a working document.

6. A system for managing contract documents over a network, comprising:
    a network computer, including:
        a memory that stores at least instructions; and
        one or more processors that execute instructions that cause performance of actions, including:
            determining one or more of training contract documents and one or more validation contract documents that are randomly selected from a plurality of contract documents;
            employing a semantic evaluator and a textual evaluator to determine one or more attributes associated with the plurality of contract documents, wherein the one or more attributes are associated with one or more localization features that are associated with the plurality of contract documents;
            employing one or more of a geolocation device or a geolocation network protocol to determine geolocation information for a physical location;
            employing the semantic evaluator and the textual evaluator to use the one or more localization features to validate one or more of categories of contract clauses or contract document types for the physical location, and wherein the geolocation information is employed to select the one or more localization features, including time zones, languages, currencies, currency formatting, or calendar formatting;
            determining one or more candidate models from a plurality of trained models based on each associated training accuracy score exceeding a threshold value, wherein the one or more candidate models are evaluated and ranked based on the request and the one or more validation contract documents; and
            generating one or more confirmed models based on the one or more evaluated and ranked candidate models, wherein the one or more confirmed models are employed to predict the one or more attribute values of a selected contract document, wherein employing the one or more confirmed models improves both efficiency of employed computing resources and accuracy of the prediction of the one or more attribute values; and a client computer, comprising:
  a memory that stores at least instructions; and
  one or more processors that execute instructions that cause performance of actions, including:
    providing one or more of the plurality of contract documents.

7. The system of claim 6, further comprising:
training a plurality of models to predict the one or more attribute values based on the one or more training contract documents and the one or more attributes, wherein each trained ML model is associated with a training accuracy score.

8. The system of claim 6, further comprising:
identifying one or more candidate attributes in the plurality of contract documents, wherein the one or more candidate attributes include one or more of a feature, type, predefined, custom, commonly repeated, or content of the plurality of contract documents; and
determining the one or more attribute values based on evaluation of the one or more candidate attributes with configuration information.

9. The system of claim 6, further comprising:
employing the one or more confirmed models to identify the one or more attributes of the document that are outliers.

10. The system of claim 6, further comprising:
employing one or more high ranked candidate models to predict one or more unknown attribute values for a working document.

11. A processor readable non-transitory storage media that includes instructions for managing contract documents over a network, wherein execution of the instructions by one or more processors on one or more network computers cause performance of performs actions, comprising:
  determining one or more of training contract documents and one or more validation contract documents that are randomly selected from a plurality of contract documents;
  employing a semantic evaluator and a textual evaluator to determine one or more attributes associated with the plurality of contract documents, wherein the one or more attributes are associated with one or more localization features that are associated with the plurality of contract documents;
  employing one or more of a geolocation device or a geolocation network protocol to determine geolocation information for a physical location;
  employing the semantic evaluator and the textual evaluator to use the one or more localization features to validate one or more of categories of contract clauses or contract document types for the physical location, and wherein the geolocation information is employed to select the one or more localization features, including time zones, languages, currencies, currency formatting, or calendar formatting;
  determining one or more candidate models from a plurality of trained models based on each associated training accuracy score exceeding a threshold value, wherein the one or more candidate models are evaluated and ranked based on the request and the one or more validation contract documents; and
  generating one or more confirmed models based on the one or more evaluated and ranked candidate models, wherein the one or more confirmed models are employed to predict the one or more attribute values of a selected contract document, wherein employing the one or more confirmed models improves both efficiency of employed computing resources and accuracy of the prediction of the one or more attribute values.

12. The processor readable non-transitory storage media of claim 11, wherein execution of the instructions by one or more processors on one or more network computers performs further actions, comprising:
training a plurality of models to predict the one or more attribute values based on the one or more training contract documents and the one or more attributes, wherein each trained ML model is associated with a training accuracy score.

13. The processor readable non-transitory storage media of claim 11, wherein execution of the instructions by one or more processors on one or more network computers performs further actions, comprising:
identifying one or more candidate attributes in the plurality of contract documents, wherein the one or more candidate attributes include one or more of a feature, type, predefined, custom, commonly repeated, or content of the plurality of contract documents; and
determining the one or more attribute values based on evaluation of the one or more candidate attributes with configuration information.

14. A network computer for managing contract documents, comprising:
  a memory that stores at least instructions; and
  one or more processors that execute instructions that cause performance of actions, including:
    determining one or more of training contract documents and one or more validation contract documents that are randomly selected from a plurality of contract documents;
    employing a semantic evaluator and a textual evaluator to determine one or more attributes associated with the plurality of contract documents, wherein the one or more attributes are associated with one or more localization features that are associated with the plurality of contract documents;
    employing one or more of a geolocation device or a geolocation network protocol to determine geolocation information for a physical location;
    employing the semantic evaluator and the textual evaluator to use the one or more localization features to validate one or more of categories of contract clauses or contract document types for the physical location, and wherein the geolocation information is employed to select the one or more localization features, including time zones, languages, currencies, currency formatting, or calendar formatting;
    determining one or more candidate models from a plurality of trained models based on each associated training accuracy score exceeding a threshold value, wherein the one or more candidate models are evaluated and ranked based on the request and the one or more validation contract documents; and
    generating one or more confirmed models based on the one or more evaluated and ranked candidate models, wherein the one or more confirmed models are employed to predict the one or more attribute values of a selected contract document, wherein employing the one or more confirmed models improves both efficiency of employed computing resources and accuracy of the prediction of the one or more attribute values.

\* \* \* \* \*

UNITED STATES PATENT AND TRADEMARK OFFICE
CERTIFICATE OF CORRECTION

PATENT NO. : 12,020,130 B2  
APPLICATION NO. : 17/186893  
DATED : June 25, 2024  
INVENTOR(S) : Chaudhari et al.

Page 1 of 1

It is certified that error appears in the above-identified patent and that said Letters Patent is hereby corrected as shown below:

In the Claims

In Column 27, Line 40, in Claim 11, delete "of performs actions," and insert -- of actions, --, therefor.

Signed and Sealed this  
Twenty-second Day of April, 2025

Coke Morgan Stewart  
*Acting Director of the United States Patent and Trademark Office*